(12) United States Patent
Kuiseko et al.

(10) Patent No.: US 6,859,334 B1
(45) Date of Patent: Feb. 22, 2005

(54) REFLECTING MICROOPTICAL SYSTEM

(75) Inventors: Manami Kuiseko, Kyoto (JP); Yasushi Kobayashi, Itami (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/450,271

(22) Filed: Nov. 26, 1999

(30) Foreign Application Priority Data

Nov. 25, 1998 (JP) .......................................... 10-333940

(51) Int. Cl.⁷ .......................... G02B 17/00; G11B 7/00
(52) U.S. Cl. ....................... 359/727; 359/726; 359/728; 369/44.11
(58) Field of Search ................................ 359/727, 728, 359/729, 726, 708; 369/44.11, 112.01, 112.05, 44.23

(56) References Cited

U.S. PATENT DOCUMENTS

| | | | | |
|---|---|---|---|---|
| 2,378,301 A | * | 6/1945 | Kaprelian | 359/731 |
| 3,059,113 A | * | 10/1962 | McHenry | 250/353 |
| 4,121,890 A | * | 10/1978 | Braun | 356/5 |
| 4,437,746 A | * | 3/1984 | Ikemori | 396/272 |
| 5,125,750 A | | 6/1992 | Corle et al. | 359/819 |
| 5,638,219 A | * | 6/1997 | Medina Puerta et al. | 359/729 |
| 5,764,613 A | | 6/1998 | Yamamoto et al. | 369/112 |
| 5,774,281 A | | 6/1998 | Maeda et al. | 359/822 |
| 5,786,947 A | | 7/1998 | Maeda et al. | 359/822 |
| 6,169,637 B1 | * | 1/2001 | Tsunashima | 359/726 |

* cited by examiner

*Primary Examiner*—Timothy Thompson
(74) *Attorney, Agent, or Firm*—Burns, Doane, Swecker & Mathis, L.L.P.

(57) ABSTRACT

A reflecting microoptical system is formed of only two optical surfaces having a continuous configuration, and has a simple configuration suitable for glass molding. Different combinations of convex, planar and concave surfaces are disclosed for the two optical surfaces, to provide different advantageous properties. In preferred embodiments of the invention, at least one, and in some cases both, of the optical surfaces have an aspherical shape to correct for aberrations.

30 Claims, 10 Drawing Sheets

REFLECTING MICROOPTICAL SYSTEM

This disclosure is based upon, and claims priority from, Japanese Patent Application No. 10-333940, filed Nov. 25, 1998, th contents of which are incorporated herein by reference.

FIELD OF THE INVENTION

The present invention relates to a reflecting microoptical system, for example of the type used in a small-size optical pickup, particularly a high-density optical recording pickup.

BACKGROUND OF THE INVENTION

Methods have conventionally been proposed for increasing the numerical aperture (NA) of an objective lens in order to increase the information recording density of optical recording media, such as optical disks, optical cards, etc. One such method is to dispose an SIL (solid immersion lens) between the optical recording medium and the objective lens. However, the addition of an SIL to an optical pickup increases the weight of the read/write head, which must be controlled to move at high speed. To avoid this problem, a method using an SIM (solid immersion mirror) has been proposed (ODF '98, Tokyo, Jun. 16, 1998, "Objective Lenses for DVD & Near Field Optical Disk Pick-up"). The SIM is a catadioptric system in which the luminous flux incident on a central portion is reflected at a peripheral portion.

Since the SIM is formed of surfaces defined by a discontinuous expression, the decentration error of each surface is large and its configuration is complicated. Therefore, it is extremely difficult to form the SIM by glass molding using a high-refractive-index glass material. When the SIM is used in a case where uniform light is incident, while the numerical aperture can be increased (the angle with respect to the light spot can be increased), a sufficient light quantity cannot be obtained because only a central part of the luminous flux can be used.

SUMMARY OF THE INVENTION

The present invention is directed to such a situation, and an object thereof is to provide a reflecting microoptical system that is formed of only two optical surfaces having a continuous configuration, and has a simple configuration suitable for glass molding. Different combinations of convex, planar and concave surfaces are disclosed for the two optical surfaces, to provide different advantageous properties. In preferred embodiments of the invention, at least one, and in some cases both, of the optical surfaces have an aspherical shape to correct for aberrations.

BRIEF DESCRIPTION OF THE DRAWINGS

Specific embodiments of the invention will be described hereinafter with reference to the examples illustrated in the accompanying figures, in which.

DETAILED DESCRIPTION

Figure 19:
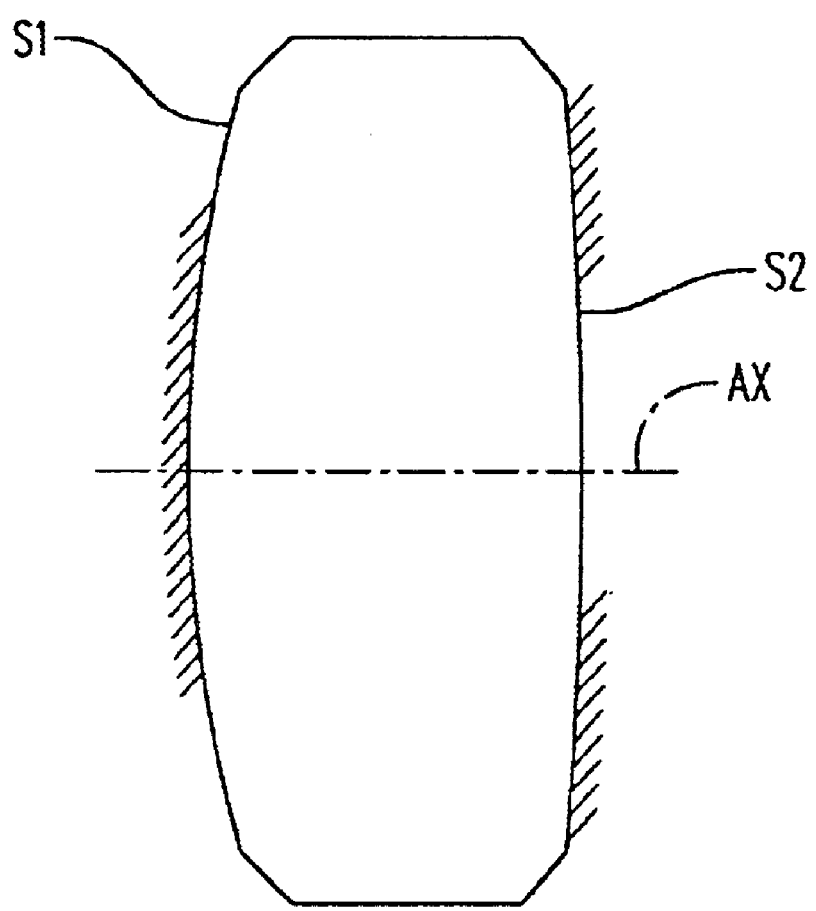
FIG. 19 is an explanatory view showing the regions of a totally reflecting coating used in the embodiments.

Hereinafter, reflecting microoptical systems embodying the present invention will be described with reference to the drawings. FIGS. 1, 3, 5, 7, 9, 11, 13, 15 and 17 show the lens constructions of nine embodiments of the invention which can be used as pickup lenses. In the figures, the surfaces marked with Si (i=1, 2) are the i-th surfaces counted from the long conjugate distance side, and the surfaces Si marked with asterisks are aspherical. With reference to FIG. 19, in all of these embodiments, in order for the incident light to be imaged on a second surface (S2) after being reflected twice within the lens, a totally reflecting coating is applied in the vicinity of the optical axis (AX) of a first surface (S1) and a peripheral zone of the second surface (S2), as indicated by the hatched areas. Since the embodiments are systems in which the light emitted from the light source is applied to an optical recording medium, the "long conjugate distance side" is the "light source side".

Figure 1:
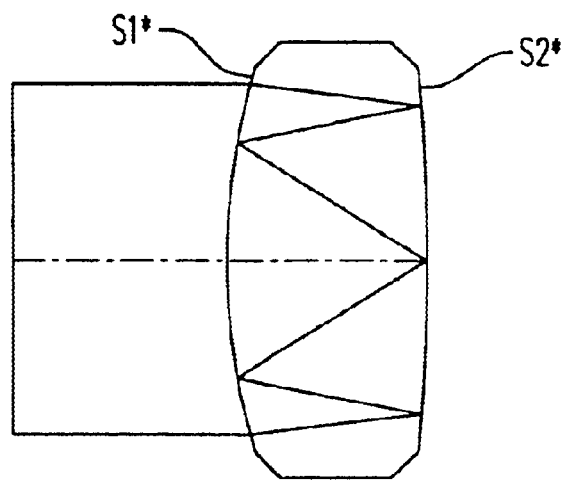
FIG. 1 shows the optical path of a first embodiment of a reflecting microoptical system in accordance with the present invention.
Figure 2:
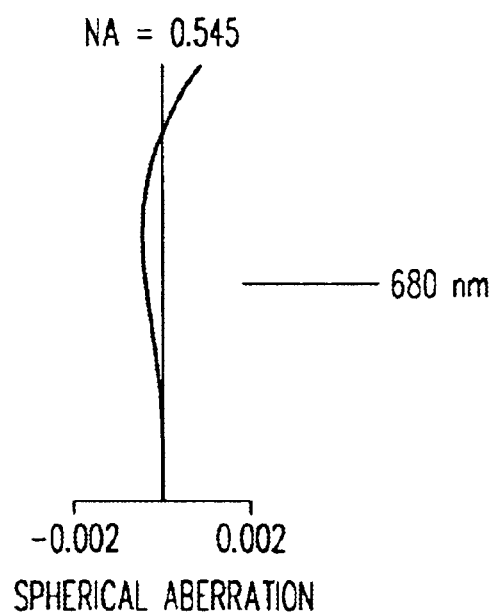
FIG. 2 shows the aberration of the first embodiment.
Figure 3:
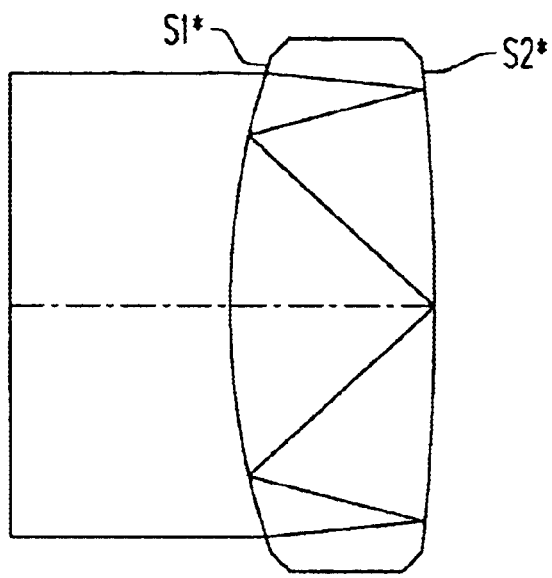
FIG. 3 shows the optical path of a second embodiment.
Figure 4:
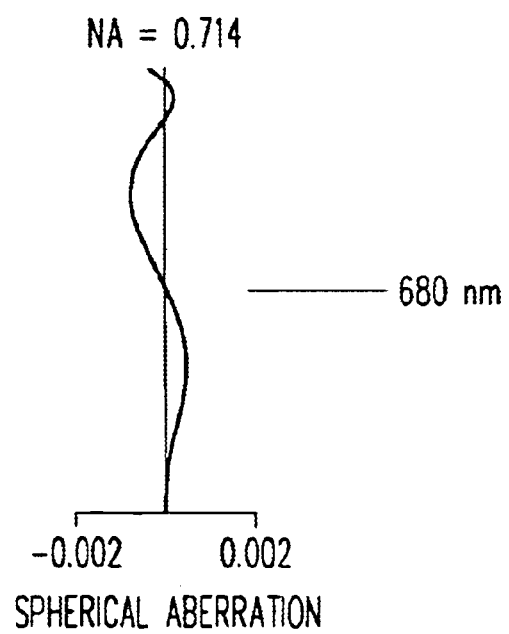
FIG. 4 shows the aberration of the second embodiment.
Figure 5:
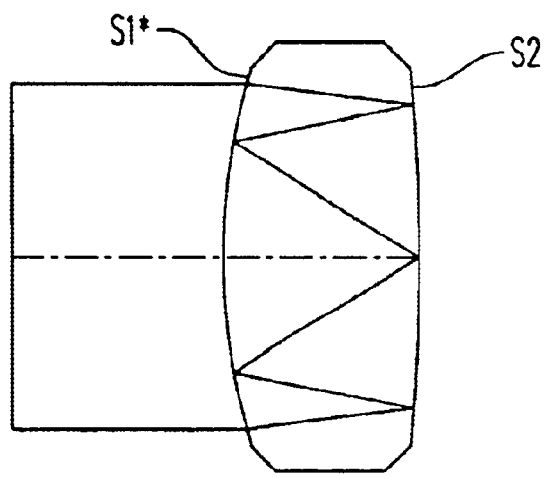
FIG. 5 shows the optical path of a third embodiment.
Figure 6:
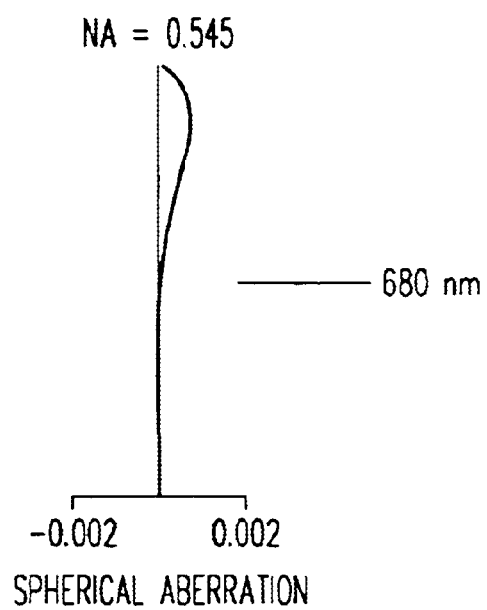
FIG. 6 shows the aberration of the third embodiment.
Figure 7:
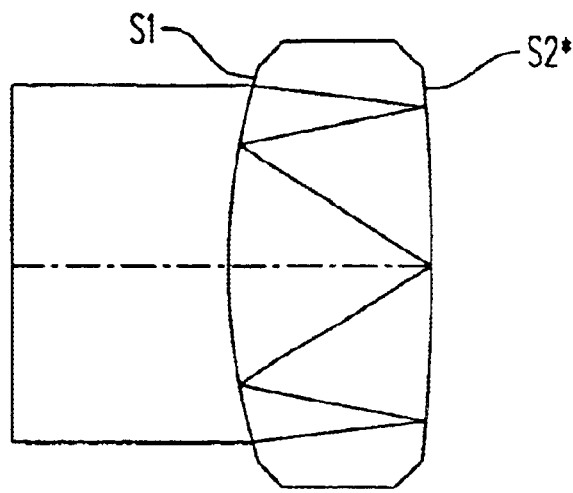
FIG. 7 shows the optical path of a fourth embodiment.
Figure 8:
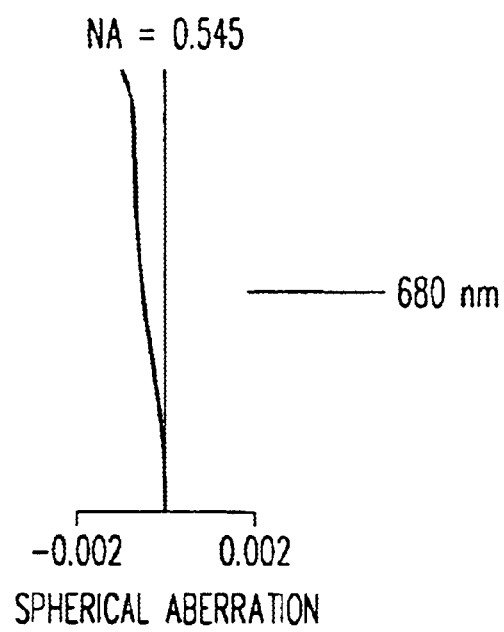
FIG. 8 shows the aberration of the fourth embodiment.

The first and the second embodiments of FIGS. 1 and 3 are biconvex pickup lenses in which the first surface (S1) and the second surface (S2) are both aspherical. In the second embodiment, the numerical aperture is greater than that of the first embodiment, and the numerical aperture in the medium exceeds 1. This means that a marginal ray is totally reflected at the second surface (S2) and the evanescent light in close proximity to the second surface (S2) is also used for optical recording. The third embodiment of FIG. 5 is a biconvex pickup lens in which only the first surface (S1) is aspherical. The fourth embodiment of FIG. 7 is a biconvex pickup lens in which only the second surface (S2) is aspherical. A structure is desirable in which, as in the first to the fourth embodiments, the first surface (S1) is convex to the long conjugate distance side and the second surface (S2) is convex to the side opposite to the long conjugate distance side. The luminous flux passing through a peripheral part of the first surface (S1) is reflected at a peripheral part of the second surface (S2), is again reflected at a central part of the first surface (S1) and is imaged in the vicinity of the vertex of the second surface (S2). Since the configurations of the first to the fourth embodiments are close to those of biconvex single lenses, like in normal single lenses, aberrations can be reliably corrected with a slight aspherical amount by increasing the curvature of the first surface (S1).

By using an aspherical surface for one of the surfaces, as in the third and the fourth embodiments, performance with a wavefront aberration of $\lambda/8$ or less can be realized. Decreasing the aberration correction burden on each surface by using aspherical surfaces for both of the surfaces, as in the first and the second embodiments, permits the numerical aperture to be increased. Therefore, by decreasing the beam spot diameter, higher-density optical recording can be handled.

Figure 9:
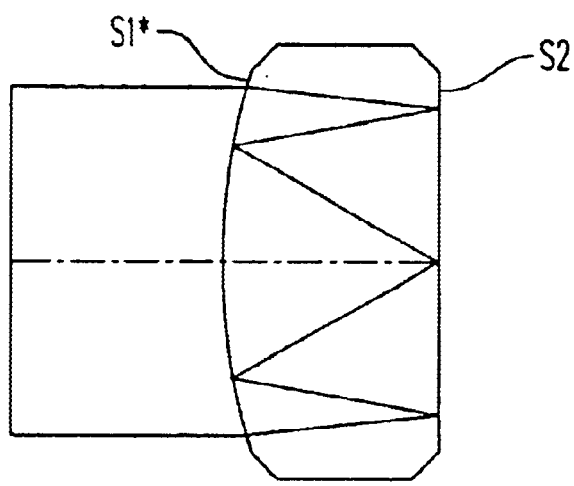
FIG. 9 shows the optical path of a fifth embodiment.
Figure 10:
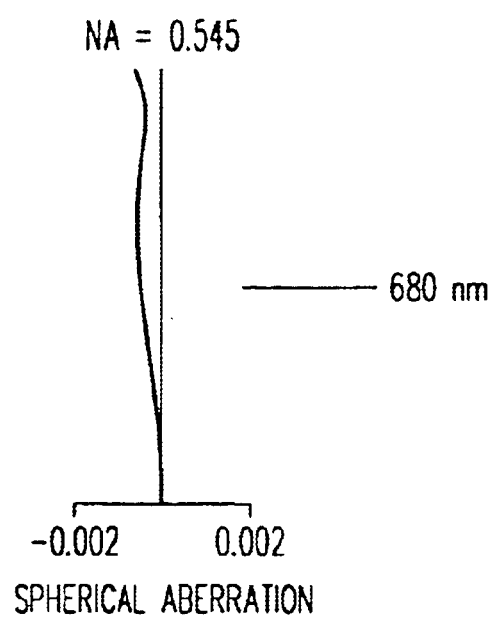
FIG. 10 shows the aberration of the fifth embodiment.

The fifth embodiment of FIG. 9 is a pickup lens in which the first surface (S1) is a convex aspherical surface and the second surface (S2) is a plane surface, in order of disposal from the long conjugate distance side. The luminous flux passing through a peripheral part of the first surface (S1) is reflected at a peripheral part of the second surface (S2), is again reflected at a central part of the first surface (S1), and is imaged in the vicinity of the vertex of the second surface (S2).

Figure 11:
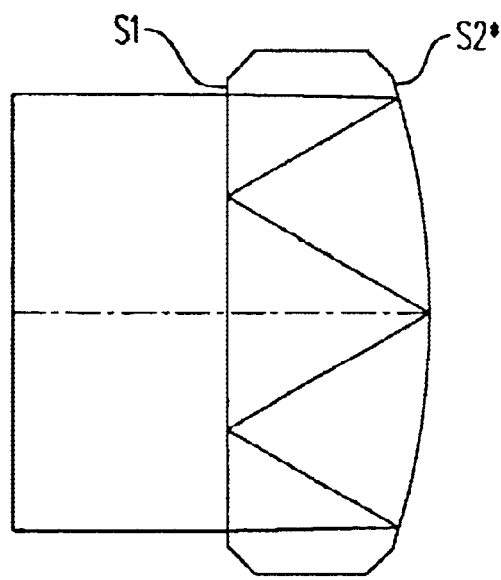
FIG. 11 shows the optical path of a sixth embodiment.
Figure 12:
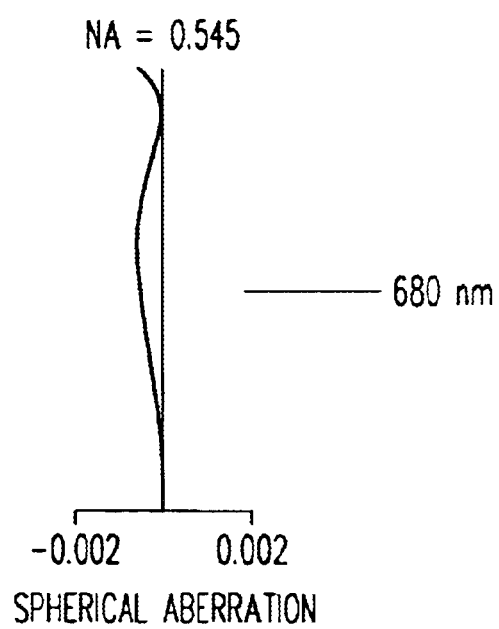
FIG. 12 shows the aberration of the sixth embodiment.
Figure 13:
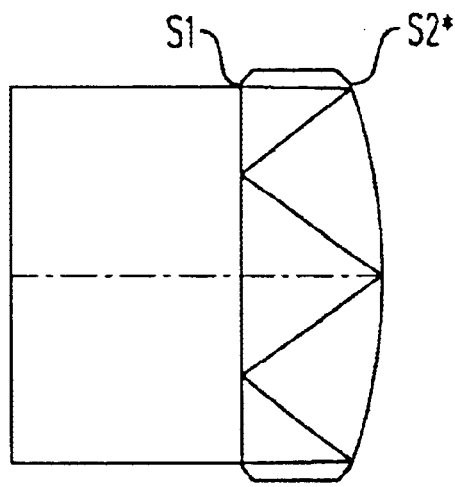
FIG. 13 shows the optical path of a seventh embodiment.
Figure 14:
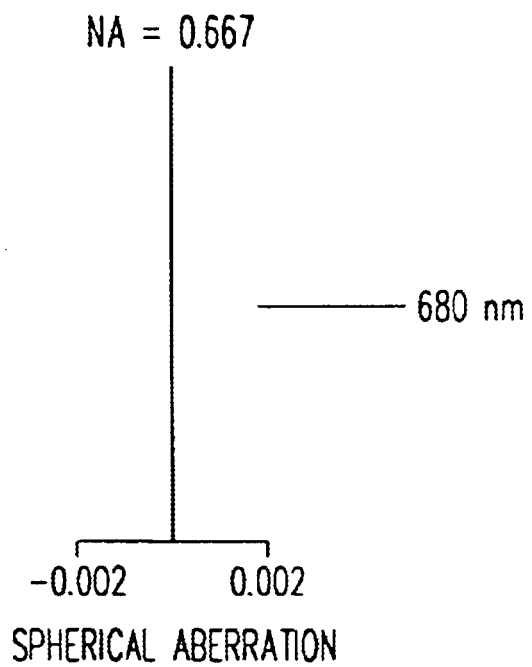
FIG. 14 shows the aberration of the seventh embodiment.

The sixth embodiment of FIG. 11 is a pickup lens in which the first surface (S1) is a plane surface and the second surface (S2) is a convex aspherical surface. The seventh embodiment of FIG. 13 is a pickup lens in which the first surface (S1) is a plane surface and a second surface (S2) is a paraboloid of revolution. In the structures of the sixth and the seventh embodiments, where the first surface (S1) is a plane surface and the second surface (S2) is convex to the side opposite to the long conjugate distance side in order of disposal from the long conjugate distance side, the luminous flux passing through a peripheral part of the first surface (S1) is reflected at a peripheral part of the second surface (S2), is again reflected at a central part of the first surface (S1) and is imaged in the vicinity of the vertex of the second surface (S2).

Aberrations can also reliably be corrected when the first surface (S1) or the second surface (S2) is a plane surface, as in the fifth to the seventh embodiments. This structure is advantageous in manufacture because decentration is small. When the second surface (S2) is a plane surface and the first surface (S1) is a high-refractive-index surface, as in the fifth embodiment, the angle of the marginal ray increases. Therefore, this structure is advantageous when it is necessary to maximize the resolution. When the first surface (S1) is a plane surface, as in the sixth and the seventh embodiments, incident collimated light is not refracted at the first surface (S1), so that no chromatic aberration is generated. Consequently, focus shift does not occur even if the laser wavelength being used varies. In addition, lasers of a plurality of different wavelengths can be used as the light source, according to the desired application. By using a paraboloid of revolution as the second surface (S2), as in the seventh embodiment, or by using an aspherical surface close to a paraboloid of revolution as the second surface (S2), a so-called stigmatic lens can be obtained.

Figure 15:
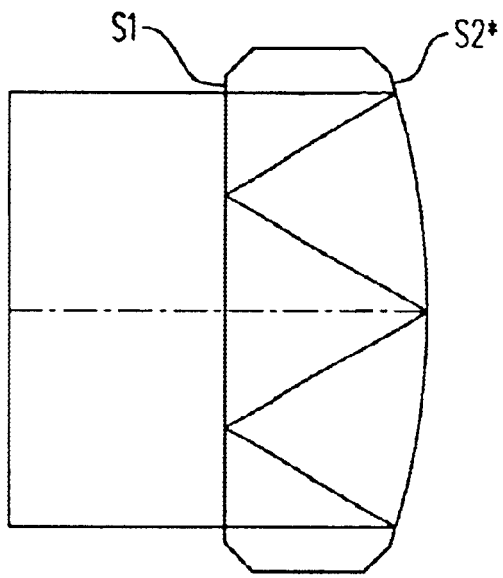
FIG. 15 shows the optical path of an eighth embodiment.
Figure 16:
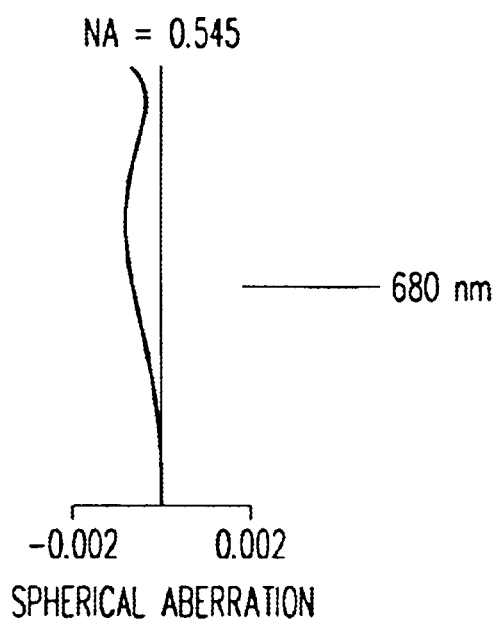
FIG. 16 shows the aberration of the eighth embodiment.
Figure 17:
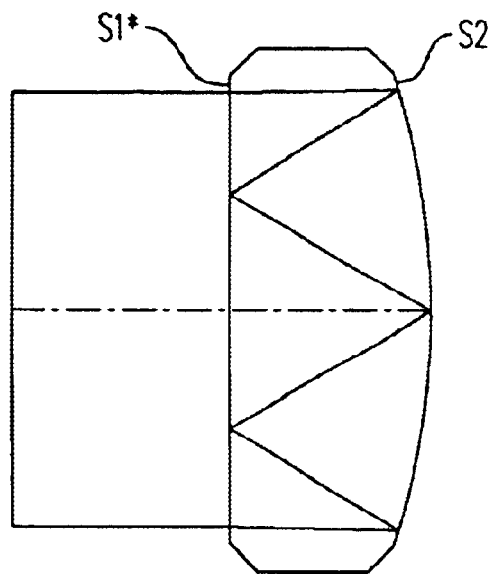
FIG. 17 shows the optical path of a ninth embodiment.
Figure 18:
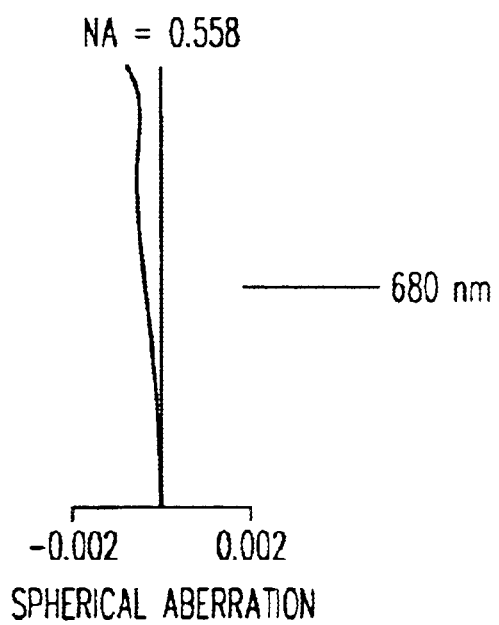
FIG. 18 shows the aberration of the ninth embodiment.

The eighth embodiment of FIG. 15 is a pickup lens in which the first surface (S1) is a concave spherical surface and the second surface (S2) is a convex aspherical surface. The ninth embodiment of FIG. 17 is a pickup lens in which the first surface (S1) is a concave aspherical surface and the second surface (S2) is a convex spherical surface. In the structures of the eighth and the ninth embodiments, where the first surface (S1) is concave to the long conjugate distance side and the second surface (S2) is strongly convex to the side opposite to the long conjugate distance side, in order of disposal from the long conjugate distance side, the luminous flux passing through a peripheral part of the first surface (S1) is reflected at a peripheral part of the second surface (S2), is again reflected at a central part of the first surface (S1), and is imaged in the vicinity of the vertex of the second surface (S2).

At first glance, the configurations of the eighth and the ninth embodiments seem disadvantageous for aberration correction. However, since the light converted into weak divergent light by the first surface (S1) is strongly converged by the second surface (S2), it is easy to correct spherical aberration. Moreover, since the first surface (S1) is a weak concave surface and a ray being angled outward is reflected at the second surface (S2), the width of the luminous flux reflected again at the first surface (S1) is smaller than that of the luminous flux a incident on the first surface (S1). Consequently, the area of the totally reflecting coating on the first surface (S1) (the hatched part in FIG. 19) can be reduced, so that the light quantity loss decreases.

By using an aspherical surface for one of the surfaces, as in the eighth and the ninth embodiments, the wavefront aberration can be reliably corrected to $\lambda/8$ or less. Moreover, by decreasing the aberration correction burden on each surface, by using aspherical surfaces for both of the surfaces, the numerical aperture can be increased. Therefore, by decreasing the beam spot diameter, higher-density optical recording can be handled.

In all of these embodiments, by providing the SIM structure in which the luminous flux passing through a peripheral part of the first surface (S1) is reflected at a peripheral part of the second surface (S2), is again reflected at a central part of the first surface (S1) and is imaged in the vicinity of the vertex of the second surface (S2), a simple configuration formed of only the two surfaces (S1, S2) of a continuous configuration and suitable for glass molding is achieved. For this reason, the embodiments are easily manufactured by glass molding using a high-refractive-index glass material and are advantageous in light quantity. Moreover, there are merits such that the weight of the head portion does not increase since the embodiments are formed of one lens element, and the condensed light spot decreases since the SIL structure performing in-lens imaging is provided. It is to be noted that the present invention is applicable not only to systems in which the light emitted from the light source is applied to an optical recording medium, but also to systems in which divergent light of the light applied to a recording medium from another system is received by a light receiving element.

Hereinafter, reflecting microoptical systems embodying the present invention will be described in more detail by providing construction data and graphic representations of aberrations. The first to ninth examples discussed below correspond to the above-described first to ninth embodiments. The lens construction views showing the first to the ninth embodiments (FIGS. 1, 3, 5, 7, 9, 11, 13, 15 and 17) show the lens constructions of the corresponding first to ninth examples. FIGS. 2, 4, 6, 8, 10, 12, 14, 16 and 18 show spherical aberrations of the first to the ninth examples.

In the construction data of the examples, Si (i=1, 2) represents the i-th surface counted from the long conjugate distance side, ri represents the radius of curvature of the surface Si, d represents the thickness (axial distance) of the lens, and N represents the refractive index of the lens. The surfaces Si marked with asterisks are aspherical. When the optical axis (AX) is the x-axis, the y-axis is within a plane perpendicular to the optical axis (AX) and the vertex is the point of origin, the aspherical surfaces are defined by the expression (AS) shown below. The wavelength $\lambda$ of the ray being used, the numerical aperture NA, the focal length fL and the aspherical data of the aspherical surfaces are also shown.

$$x = (C \cdot y^2)/\{1 + \sqrt{(1 - \epsilon \cdot C^2 \cdot y^2)}\} + \Sigma(Ai \cdot y^i) \qquad (AS)$$

where x is the amount of displacement from the reference surface in the direction of the optical axis (AX) at a height y, y is the height in a direction perpendicular to the optical axis (AX), C is the curvature at the vertex, E is the conic constant, and Ai is the i-th aspherical coefficient.

---

1st embodiment $\lambda$ = 680 nm, NA = 0.545 (in air), fL = 1.834

| (surface) | (radius of curvature) | (Axial Distance) | (refractive index) |
|---|---|---|---|
| S1* | r1 = 3.80245 | | |
| | | d = 1.12794 | N = 1.83375 |
| S2* | r2 = −16.95438 | | |

Aspherical coefficient of the first surface (S1)

$\epsilon$ = 1.00000000
A4 = −0.11292560 × $10^{-2}$
A6 = −0.43982818 × $10^{-3}$
A8 = −0.36085168 × $10^{-3}$
A10 = −0.31090594 × $10^{-3}$
Aspherical coefficient of the second surface (S2)

$\epsilon$ = 1.00000000
A4 = 0.29258470 × $10^{-2}$
A6 = 0.15051402 × $10^{-4}$
A8 = −0.26476511 × $10^{-3}$
A10 = −0.20066942 × $10^{-3}$

---

2nd embodiment $\lambda$ = 680 nm, NA = 0.714 (in air), fL = 1.834

| (surface) | (radius of curvature) | (Axial Distance) | (refractive index) |
|---|---|---|---|
| S1* | r1 = 3.81254 | | |
| | | d = 1.12694 | N = 1.83375 |
| S2* | r2 = −16.71558 | | |

Aspherical coefficient of the first surface (S1)

$\epsilon$ = 1.00000000
A4 = 0.70512314 × $10^{-3}$
A6 = −0.61423621 × $10^{-3}$
A8 = −0.58788514 × $10^{-3}$
A10 = −0.86000992 × $10^{-3}$
Aspherical coefficient of the second surface (S2)

$\epsilon$ = 1.00000000
A4 = 0.43189895 × $10^{-2}$
A6 = −0.56153643 × $10^{-4}$
A8 = −0.13130585 × $10^{-2}$
A10 = 0.19684362 × $10^{-4}$

---

3rd embodiment $\lambda$ = 680 nm, NA = 0.545 (in air), fL = 1.834

| (surface) | (radius of curvature) | (Axial Distance) | (refractive index) |
|---|---|---|---|
| S1* | r1 = 3.80058 | | |
| | | d = 1.12844 | N = 1.83375 |
| S2 | r2 = −16.97581 | | |

Aspherical coefficient of the first surface (S1)

$\epsilon$ = 1.00000000
A4 = −0.56964867 × $10^{-2}$
A6 = −0.72642979 × $10^{-3}$
A8 = 0.48513914 × $10^{-4}$
A10 = 0.23077580 × $10^{-3}$

---

4th embodiment $\lambda$ = 680 nm, NA = 0.545 (in air), fL = 1.852

| (surface) | (radius of curvature) | (Axial Distance) | (refractive index) |
|---|---|---|---|
| S1 | r1 = 3.94291 | | |
| | | d = 1.12794 | N = 1.83375 |
| S2* | r2 = −15.05560 | | |

Aspherical coefficient of the second surface (S2)

$\epsilon$ = 1.00000000
A4 = 0.34606391 × $10^{-2}$
A6 = 0.32398624 × $10^{-3}$
A8 = −0.38641880 × $10^{-4}$
A10 = −0.36089082 × $10^{-4}$

---

5th embodiment $\lambda$ = 680 nm, NA = 0.545 (in air), fL = 1.834

| (surface) | (radius of curvature) | (Axial Distance) | (refractive index) |
|---|---|---|---|
| S1* | r1 = 3.26153 | | |
| | | d = 1.21331 | N = 1.83375 |
| S2 | r2 = ∞ | | |

Aspherical coefficient of the first surface (S1)

$\epsilon$ = 1.00000000
A4 = −0.50230845 × $10^{-2}$
A6 = −0.69916764 × $10^{-3}$
A8 = −0.17985913 × $10^{-4}$
A10 = 0.14516630 × $10^{-3}$

---

6th embodiment $\lambda$ = 680 nm, NA = 0.545 (in air), fL = 2.256

| (surface) | (radius of curvature) | (Axial Distance) | (refractive index) |
|---|---|---|---|
| S1 | r1 = ∞ | | |
| | | d = 1.12794 | N = 1.83375 |
| S2* | r2 = −4.51264 | | |

Aspherical coefficient of the second surface (S2)

$\epsilon$ = 1.00000000
A4 = 0.13233603 × $10^{-2}$
A6 = 0.22793168 × $10^{-4}$
A8 = 0.48985589 × $10^{-4}$
A10 = −0.19239174 × $10^{-4}$

---

7th embodiment $\lambda$ = 680 nm, NA = 0.667 (in air), fL = 3.000

| (surface) | (radius of curvature) | (Axial Distance) | (refractive index) |
|---|---|---|---|
| S1 | r1 = ∞ | | |
| | | d = 1.50000 | N = 1.83375 |
| S2* | r2 = −6.00000 | | |

Aspherical coefficient of the second surface (S2)

$\epsilon$ = 1.00000000
A4 = 0.57870093 × $10^{-3}$
A6 = 0.80424469 × $10^{-5}$
A8 = 0.13660248 × $10^{-6}$
A10 = 0.34335882 × $10^{-8}$

---

8th embodiment $\lambda$ = 680 nm, NA = 0.545 (in air), fL = 2.270

| (surface) | (radius of curvature) | (Axial Distance) | (refractive index) |
|---|---|---|---|
| S1 | r1 = −100.87631 | | |
| | | d = 1.12794 | N = 1.83375 |
| S2* | r2 = −4.41934 | | |

-continued

Aspherical coefficient of the second surface (S2)

$\epsilon = 1.00000000$
$A4 = 0.12921255 \times 10^{-2}$
$A6 = 0.14705320 \times 10^{-4}$
$A8 = 0.48466904 \times 10^{-4}$
$A10 = -0.16958548 \times 10^{-4}$ 9th embodiment $\lambda = 680$ nm, NA = 0.558 (in air), fL = 2.217

| (surface) | (radius of curvature) | (Axial Distance) | (refractive index) |
|---|---|---|---|
| S1* | r1 = 314.51013 | | |
| | | d = 1.11024 | N = 1.83375 |
| S2 | r2 = -4.47227 | | |

Aspherical coefficient of the first surface (S1)

$\epsilon = 1.00000000$
$A4 = -0.48519953 \times 10^{-2}$
$A6 = 0.24538094 \times 10^{-3}$
$A8 = -0.11191141 \times 10^{-3}$
$A10 = 0.44340458 \times 10^{-4}$ According to the above-described examples, a reflecting microoptical system can be realized that is formed of only two surfaces of a continuous configuration, and has a simple configuration suitable for glass molding.

It will be appreciated by those of ordinary skill in the art that the present invention can be embodied in other specific forms without departing from the spirit or essential characteristics thereof. The presently disclosed embodiments are therefore considered in all respects to be illustrative, and not restrictive. The scope of the invention is indicated by the appended claims, rather than the foregoing description, and all changes that come within the meaning and range of equivalents thereof are intended to be embraced therein.

What is claimed is:

1. An optical system for use in an optical pickup for recording information onto a recording medium, said optical system comprising:
   a lens element for focusing incident luminous flux at a predetermined position, said lens element having, from a long conjugate distance side, a first surface convex to the long conjugate distance side and a second aspherical surface convex to a side opposite to the long conjugate distance side,
   wherein the incident luminous flux is laser light and passes through a peripheral part of said first surface, is reflected at a peripheral part of said second surface, is again reflected at a central part of said first surface and is imaged on an optical axis of the lens element as a light spot to optically record information on the recording medium.

2. An optical system as claimed in claim 1, wherein said first surface and said second surface are both aspherical.

3. An optical system for use in an optical pickup to record information on a recording medium, said optical system comprising:
   a lens element for focusing incident luminous flux at a predetermined position, said lens element having, from a long conjugate distance side, a first surface concave to the long conjugate distance side and a second aspherical surface convex to a side opposite to the long conjugate distance side,
   wherein the incident luminous flux is laser light and passes through a peripheral part of said first surface, is reflected at a peripheral part of said second surface, is again reflected at a central part of said first surface and is imaged on an optical axis of the lens element as a light spot to optically record information on the recording medium.

4. An optical system as claimed in claim 3, wherein said first surface and said second surface are both aspherical.

5. An optical system for use in an optical pickup to record information on a recording medium, said optical system comprising a lens element having a first convex surface on the long conjugate distance side thereof with a first reflective coating on a central portion thereof and a light admitting area on said first convex surface at the periphery of said first reflective coating, and a second aspherical convex surface on the opposite side thereof with a second reflective coating on a peripheral portion and a light transmissive region at the central portion thereof, wherein incident laser light passing through the light admitting area of said first convex surface is totally reflected on the second reflective coating, is again totally reflected on the first reflective coating and is imaged in the vicinity of the vertex of the second aspherical convex surface as a light spot to optically record information on the recording medium.

6. The optical system of claim 5 wherein both of said first and second surfaces have an aspherical shape.

7. An optical system for use in an optical pickup to record information on a recording medium, said optical system comprising a lens element having a first concave surface on the long conjugate distance side thereof with a first reflective coating on a central portion thereof and a light admitting area on said first concave surface at the periphery of said reflective coating, and a second convex surface on the opposite side thereof with a second reflective coating on a peripheral portion thereof and a light transmissive region at the central portion thereof, wherein incident laser light passing through the light admitting area of said first concave surface is totally reflected on the second reflective coating, is again totally reflected on the first reflective coating and is imaged in the vicinity of the vertex of the second convex surface as a light spot to optically record information on the recording medium.

8. The optical system of claim 7 wherein at least one of said surfaces has an aspherical shape.

9. The optical system of claim 8 wherein said first surface has an aspherical shape.

10. The optical system of claim 8 wherein said second surface has an aspherical shape.

11. The optical system of claim 5 wherein said lens element is made of molded glass.

12. The optical system of claim 7 wherein said lens element is made of molded glass.

13. An optical system for use in an optical pickup to record information on a recording medium, said optical system comprising:
   a lens element for focusing incident luminous flux, said lens element having, from a long conjugate distance side, a first surface concave to the long conjugate distance side and a second surface convex to a side opposite to the long conjugate distance side,
   wherein the luminous flux is laser light and passes through a peripheral part of said first surface, is reflected once at a peripheral part of said second surface, is thereafter reflected a second time at a central part of said first surface and is imaged on an optical axis of the lens element upon being reflected said second time as a light spot to optically record information on the recording medium.

14. An optical system for use in an optical pickup to record information on a recording medium, said optical system comprising:
  a lens element having, from a long conjugate distance side:
  a plane surface with a first reflective coating on a central portion thereof and a light admitting area at the periphery of the first reflective coating, and
  a surface convex to a side opposite to the long conjugate distance side with a second reflective coating on a peripheral portion thereof and a light transmissive region at the central portion thereof,
  wherein incident laser light passing through the light admitting area of said plane surface is reflected on the second reflective coating, is again reflected on the first reflective coating and is imaged in the vicinity of the vertex of the convex surface as a light spot to optically record information on the recording medium.

15. An optical system for use in an optical pickup comprising:
  a lens element having, from a long conjugate distance side:
  a plane surface with a first reflective coating on a central portion thereof and a light admitting area at the periphery of the first reflective coating, and
  a surface convex to a side opposite to the long conjugate distance side with a second reflective coating on a peripheral portion thereof and a light transmissive region at the central portion thereof,
  wherein incident luminous flux passing through the light admitting area of said plane surface is reflected on the second reflective coating, is again reflected on the first reflective coating and is imaged in the vicinity of the vertex of the convex surface,
  and wherein a marginal ray of the luminous flux reflected on the first reflective coating of the plane surface is totally reflected at the light transmissive region of the convex surface.

16. The optical system of claim 1 wherein a numerical aperture in a medium of the lens element exceeds 1, and evanescent light is used for optical recording onto the recording medium.

17. The optical system of claim 3 wherein a numerical aperture in a medium of the lens element exceeds 1, and evanescent light is used for optical recording onto the recording medium.

18. The optical system of claim 5 wherein a numerical aperture in a medium of the lens element exceeds 1, and evanescent light is used for optical recording onto the recording medium.

19. The optical system of claim 7 wherein a numerical aperture in a medium of the lens element exceeds 1, and evanescent light is used for optical recording onto the recording medium.

20. The optical system of claim 13 wherein a numerical aperture in a medium of the lens element exceeds 1, and evanescent light is used for optical recording onto the recording medium.

21. An optical system for use in an optical pickup for recording information onto a recording medium, the optical system comprising:
  a lens element for focusing incident luminous flux in the form of laser light at a predetermined position, said lens element having, from a long conjugate distance side thereof,
  a first surface for receiving the incident luminous flux, and
  a second surface opposed to the first surface,
  wherein the luminous flux passing through a peripheral part of said first surface is reflected at a peripheral part of said second surface, is again reflected at a central part of said first surface and imaged on an optical axis of the lens element, thereby forming an imaged light spot on the optical axis of the lens element to optically record onto the recording medium.

22. The optical system of claim 21, wherein the imaged light spot used for optical recording onto the recording medium includes evanescent light.

23. The optical system of claim 21, wherein a numerical aperture in a medium of the lens element exceeds 1, and evanescent light is used for optical recording onto the recording medium.

24. The optical system of claim 21, wherein the first surface is convex to the long conjugate distance thereof.

25. The optical system of claim 21, wherein the first surface is concave to the long conjugate distance thereof.

26. An optical system for use in an optical pickup for recording information onto a recording medium by focusing laser light, the optical system comprising, from a long conjugate distance side thereof,
  a first surface for receiving the incident laser light, and
  a second surface for making the laser light converge, the second surface being opposed to the first surface,
  wherein the laser light passing through a peripheral part of said first surface is reflected at said second surface, is again reflected at a central part of said first surface and is imaged at an exit surface on an optical axis of the optical system, thereby forming an imaged light spot to optically record onto the recording medium.

27. The optical system of claim 26, wherein the imaged light spot used for optical recording onto the recording medium includes evanescent light.

28. The optical system of claim 26, wherein a numerical aperture in a medium of the optical system exceeds 1, and evanescent light is used for optical recording onto the recording medium.

29. The optical system of claim 26, wherein the first surface is convex to the long conjugate distance thereof.

30. The optical system of claim 26, wherein the first surface is concave to the long conjugate distance thereof.

* * * * *